No. 649,022. Patented May 8, 1900.
S. T. & C. H. WELLMAN.
APPARATUS FOR MANUFACTURING OPEN HEARTH STEEL.
(Application filed Oct. 24, 1898.)
(No Model.) 3 Sheets—Sheet 1.
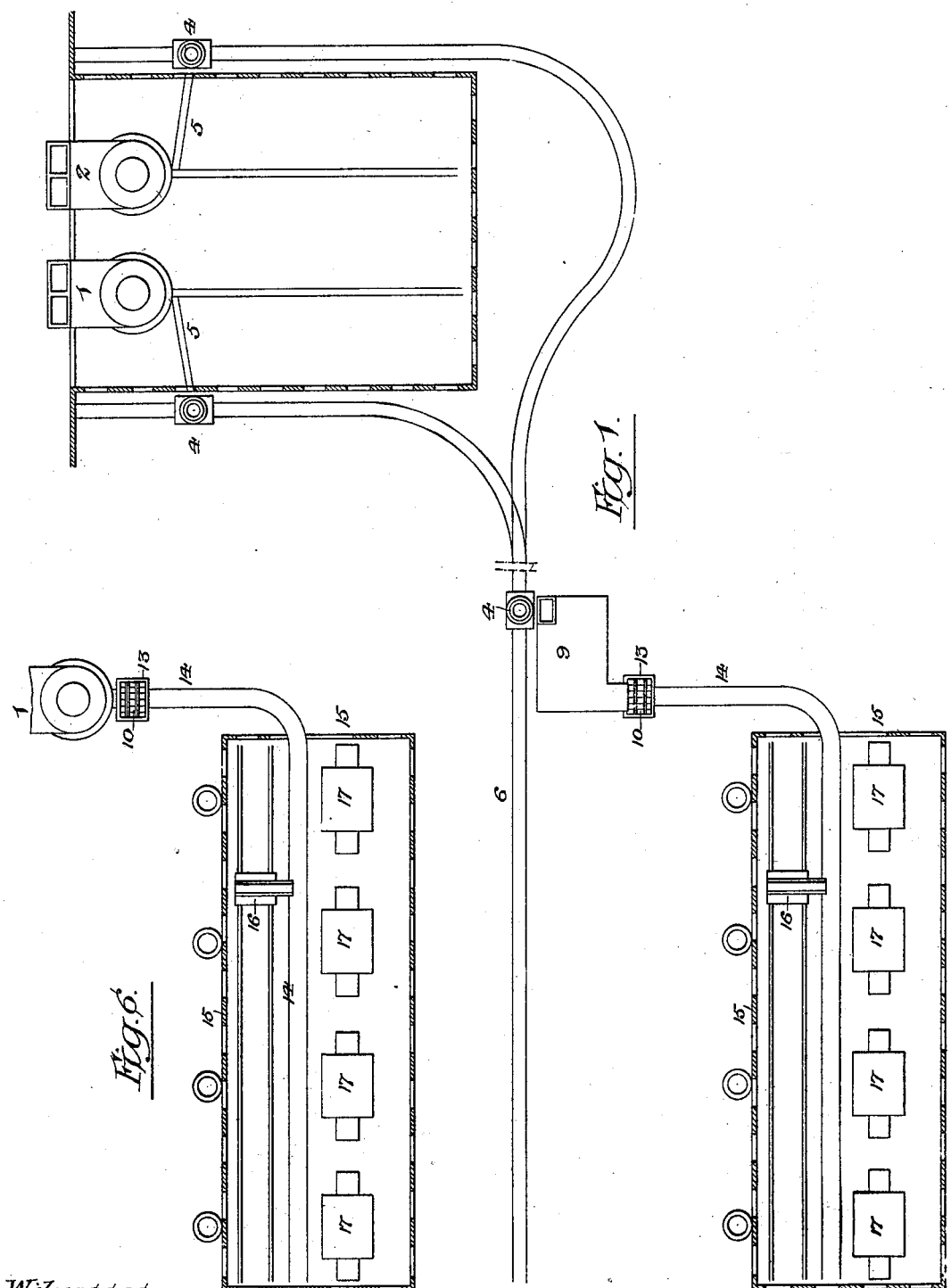

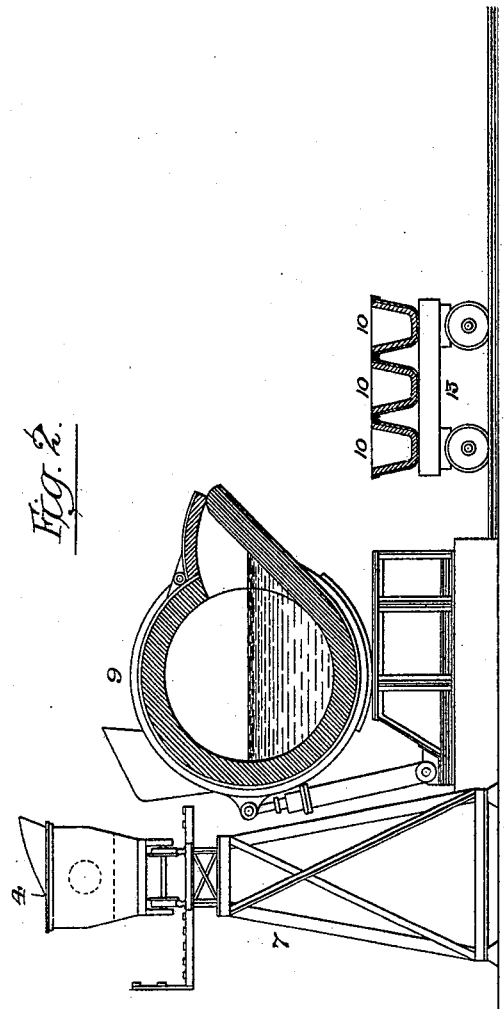

No. 649,022. Patented May 8, 1900.
S. T. & C. H. WELLMAN.
APPARATUS FOR MANUFACTURING OPEN HEARTH STEEL.
(Application filed Oct. 24, 1898.)
(No Model.) 3 Sheets—Sheet 3.
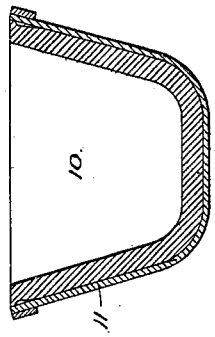
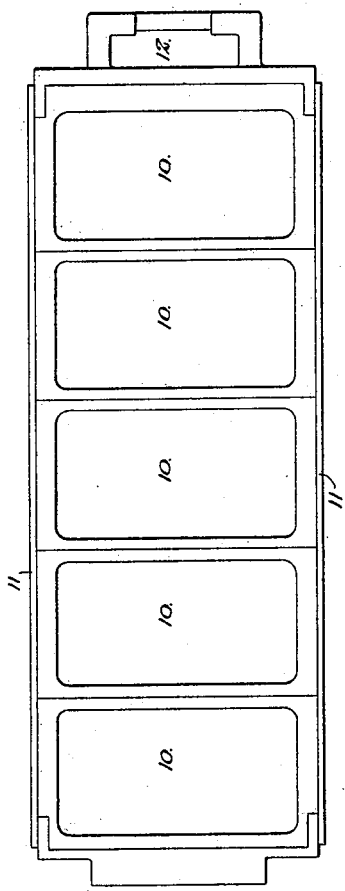
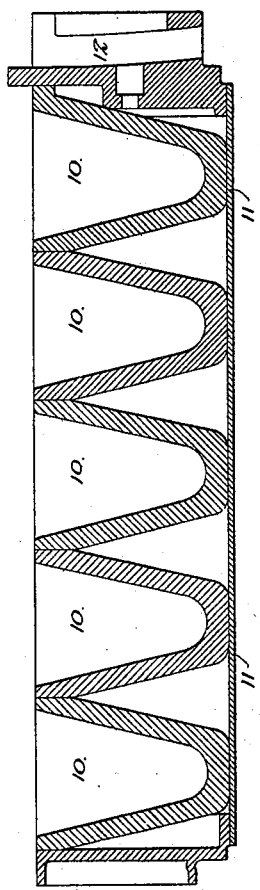

UNITED STATES PATENT OFFICE.

SAMUEL T. WELLMAN AND CHARLES H. WELLMAN, OF CLEVELAND, OHIO.

APPARATUS FOR MANUFACTURING OPEN-HEARTH STEEL.

SPECIFICATION forming part of Letters Patent No. 649,022, dated May 8, 1900.

Application filed October 24, 1898. Serial No. 694,442. (No model.)

*To all whom it may concern:*

Be it known that we, SAMUEL T. WELLMAN and CHARLES H. WELLMAN, citizens of the United States, residing at Cleveland, Ohio, have invented certain new and useful Improvements in Apparatus for Manufacturing Open-Hearth Steel, of which the following is a specification.

In the ordinary system of open-hearth-steel manufacture the furnaces are usually charged with cold pig-iron and scrap, which are reduced to the molten condition in the furnace; but recently experiments have been made in the way of charging the furnaces with molten iron obtained directly from a blast-furnace or cupola, and while some of these experiments have met with considerable success, yet the saving has not been all that was expected. The saving at the blast-furnace is enough to warrant the use of the direct process where a small percentage of pig-iron is used in the open-hearth furnace, and we have found that when a large percentage of molten pig-iron is used in the open-hearth furnace it takes about as long and requires about as much fuel to reduce and eliminate the carbon and other impurities from the iron as it does when the iron is charged cold, for in the latter case the iron as it melts comes into contact with the lime, ore, or other oxidizing agents, and by the time it is melted the impurities are about eliminated from it, and the result is attained without that violent reaction which takes place when the metal is charged in the liquid form, these violent reactions being destructive of the furnace bottom and lining, so as to materially increase the cost of repairs.

As the cost of iron is in most cases less than the cost of scrap, it is desirable to use a very large percentage of iron and a minimum amount of scrap; and the object of our invention is to provide a plan whereby this may be effected without the objections attendant upon the use of molten iron and at the same time without the expenditure of as great an amount of time and fuel as is necessitated when pig-iron is charged cold. This object we attain in the manner hereinbefore set forth, reference being had to the accompanying drawings, in which—

Figure 1 is a diagram representing a preferable form of steel-making plant designed for carrying out our invention. Fig. 2 is a sectional view, on a larger scale, of part of the mechanism employed. Figs. 3, 4, and 5 are respectively a plan view, a longitudinal section, and a transverse section of a multiple-mold charging-box which we employ in carrying out our invention; and Fig. 6 is a diagram illustrating a modification of our invention.

In Fig. 1 we have shown a structure containing two blast-furnaces 1 and 2, and alongside of the casting-house of each furnace are tracks for a wheeled truck carrying a ladle 4, into which the molten metal from the blast-furnace can be run through a suitable spout 5 instead of being run onto the casting-floor, as usual. These tracks unite in a single track 6, the grade of which is gradually raised, so that the track is finally supported upon the elevated trestle 7, as shown in Fig. 2, and the ladle can discharge its contents into the rocking or tilting mixing-furnace 9, which may be of any available character, being, however, of large capacity and preferably provided with means for constantly heating it and with a supply of oxidizing-slag, whereby the desiliconization or partial desiliconization of the molten iron poured into the same may be effected. By the use of this mixing-furnace we are enabled to provide charges for the open-hearth furnace having a substantially-uniform percentage of impurities, since the variations in the percentage of impurities contained in successive charges from the blast-furnace are corrected by the mixing-furnace, the discharge from the latter containing an amount of impurity representing the average of that contained in the successive charges from the blast-furnaces. The discharge-spout of the mixing-furnace delivers into molds 10, which are arranged side by side in groups, each group or series of molds being confined together by a casing 11, which surrounds said molds and holds them firmly in place and has at one end a socket 12 for the reception of the end of the discharge-bar of an open-hearth-furnace-charging machine—such, for instance, as that shown in our Patent No. 569,075, dated October 6, 1896—each of these casings, with its group or series of molds, thus forming a multiple-mold charging-box which can be handled as a unit by the charging-machine. It will be readily understood that the molds may be confined to the casing by any suitable means, such as rivets, or by being so snugly fitted together that they are prevented from falling out of the casing when the molds are inverted, as seen in Fig. 4. A number of these boxes are placed together upon a suitable wheeled truck 13, adapted to a track 14, so that one charging-box after another can be moved beneath the spout of the furnace 9 until the molds of all the charging-boxes have been loaded, whereupon the truck, with its loaded boxes, can be run into the open-hearth-furnace house 15, and the contents of the charging-boxes can be delivered, by means of the charging-machine 16, into any one of the series of open-hearth furnaces 17 contained in said house. The charging-boxes are engaged in succession by the charging-bar of the machine, lifted from the truck, thrust into the furnace, inverted, so as to discharge the contents, restored to normal position, withdrawn from the furnace, and redeposited upon the truck. By this means the extremely-expeditious handling of the metal can be effected, and yet in being conveyed from the mixing-furnace to the charging-machine the metal in each of the molds of each charging-box will, owing to its limited bulk, become sufficiently cooled to retain its form, while at the same time it will retain so much of its original heat that when it is charged into the open-hearth furnace it can be reduced to the molten condition in much less time and with a much less expenditure of fuel than a charge of cold pig-iron. By thus charging small hot pigs of iron into the open-hearth furnace with charges of ore and limestone or other oxidizing or slag-forming materials the latter will be intimately mixed with the iron blocks. Hence as said blocks melt the iron will come into intimate contact with the oxidizing agents and the impurities will be eliminated; but the operation will be a gradual one and not accompanied by those violent and destructive reactions which attend the elimination of the impurities from the iron when the latter is charged in the molten state.

While the use of the mixing-furnace is, for reasons before given, always to be preferred, some of the advantages of our invention may be attained without the use of such mixing-furnace, and in Fig. 6 we have shown a diagram of a plant in which the molten metal is run directly from a blast-furnace, cupola, or other melting-furnace into the molds of the charging-boxes and conveyed by the latter to the open-hearth-furnace house to be charged into the furnace contained in the latter.

Having thus described our invention, what we claim, and desire to secure by Letters Patent, is—

1. The combination of a furnace for containing molten iron, a charging-box containing a series of molds, an open-hearth furnace, a charging-machine operating in conjunction therewith, and means for conveying the multiple-mold charging-box from the furnace which fills the same to the open-hearth-furnace-charging machine, substantially as specified.

2. The combination of a melting-furnace, a mixing-furnace, an open-hearth furnace, a charging-machine operating in conjunction with the latter, a ladle for receiving molten metal from the melting-furnace, a charging-box containing a group or series of molds for receiving metal from the mixing-furnace, means for conveying the ladle from the melting-furnace to the mixing-furnace, and means for conveying the multiple-mold charging-box from the mixing-furnace to the open-hearth-furnace-charging machine, substantially as specified.

In testimony whereof we have signed our names to this specification in the presence of subscribing witnesses.

SAMUEL T. WELLMAN.
  CHARLES H. WELLMAN.

Witnesses as to Samuel T. Wellman:
 H. D. JAMESON,
 F. L. RANDS.

Witnesses as to Charles H. Wellman:
 W. COMSTOCK,
 JOHN MCGEORGE.